(12) United States Patent
Seo et al.

(10) Patent No.: US 12,271,323 B2
(45) Date of Patent: Apr. 8, 2025

(54) ELECTRONIC DEVICE AND METHOD FOR PERFORMING GARBAGE COLLECTION

(71) Applicant: SAMSUNG ELECTRONICS CO., LTD., Suwon-si (KR)

(72) Inventors: Sungjong Seo, Suwon-si (KR); Yeongjin Gil, Suwon-si (KR); Hyeongjun Kim, Suwon-si (KR); Woojoong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 55 days.

(21) Appl. No.: 18/201,072

(22) Filed: May 23, 2023

(65) Prior Publication Data

US 2023/0297522 A1    Sep. 21, 2023

Related U.S. Application Data

(63) Continuation of application No. PCT/KR2021/018282, filed on Dec. 3, 2021.

(30) Foreign Application Priority Data

Dec. 4, 2020 (KR) .......................... 10-2020-0168751

(51) Int. Cl.
*G06F 13/16* (2006.01)
*G06F 12/02* (2006.01)
*G06F 13/40* (2006.01)

(52) U.S. Cl.
CPC ...... *G06F 13/1673* (2013.01); *G06F 12/0253* (2013.01); *G06F 13/4068* (2013.01)

(58) Field of Classification Search
CPC ............. G06F 13/1673; G06F 12/0253; G06F 13/4068
See application file for complete search history.

(56) References Cited

U.S. PATENT DOCUMENTS 5,682,497 A * 10/1997 Robinson .............. G06F 3/0601
711/170
10,152,993 B1 * 12/2018 Yamamoto .............. G06F 16/18
(Continued)

FOREIGN PATENT DOCUMENTS

JP          2019-133391 A       8/2019
KR    10-2004-0084889 A      10/2004
(Continued)

OTHER PUBLICATIONS

Written Opinion (PCT/ISA/237) issued Mar. 25, 2022 by the International Searching authority for International Patent Application No. PCT/KR2021/018282.
(Continued)

*Primary Examiner* — Francisco A Grullon
(74) *Attorney, Agent, or Firm* — Sughrue Mion, PLLC

(57) ABSTRACT

An electronic device includes: a storage device including multiple segments configured to store data; a buffer memory configured to store segment attributes corresponding to the multiple segments, respectively; and one processor electrically connected to the storage device and the buffer memory. The one processor is configured to: determine, based on two or more parameters related to a data requested to be written, a data attribute; store the data requested to be written in a segment of the multiple segments, the segment being corresponding to the data attribute among the multiple segments; store a segment attribute of the segment, which is determined based on the data attribute in the buffer memory; update the data attribute, based on a data modification time of the data requested to be written; and update the segment attribute, based on the updated data attribute.

13 Claims, 13 Drawing Sheets

(56) References Cited

U.S. PATENT DOCUMENTS

| | | |
|---|---|---|
| 10,564,879 B2 | 2/2020 | Byun |
| 10,613,796 B2 | 4/2020 | Kanno et al. |
| 10,671,287 B2 | 6/2020 | Doh et al. |
| 11,144,225 B2 | 10/2021 | Oh et al. |
| 11,237,742 B2 | 2/2022 | Lee |
| 11,243,716 B2 | 2/2022 | Kwak |
| 2004/0133540 A1 | 7/2004 | Saake et al. |
| 2005/0132129 A1* | 6/2005 | Venkiteswaran ....... G06F 12/00 711/E12.019 |
| 2005/0172082 A1* | 8/2005 | Liu .................... G06F 12/0866 711/3 |
| 2006/0149902 A1* | 7/2006 | Yun .................... G06F 12/0866 711/E12.019 |
| 2008/0104357 A1* | 5/2008 | Kim .................... G06F 12/0246 711/170 |
| 2011/0055464 A1 | 3/2011 | Moon et al. |
| 2013/0166824 A1* | 6/2013 | Shim .................. G06F 12/0246 711/E12.008 |
| 2013/0262533 A1 | 10/2013 | Mitra et al. |
| 2017/0192892 A1* | 7/2017 | Pundir ................. G06F 3/0644 |
| 2019/0294345 A1* | 9/2019 | Yu ....................... G06F 12/0638 |
| 2020/0089427 A1 | 3/2020 | Lee et al. |
| 2021/0109856 A1 | 4/2021 | Lee et al. |

FOREIGN PATENT DOCUMENTS

| | | |
|---|---|---|
| KR | 10-2013-0111283 A | 10/2013 |
| KR | 10-2017-0139359 A | 12/2017 |
| KR | 10-2019-0056211 A | 5/2019 |
| KR | 10-2019-0074677 A | 6/2019 |
| KR | 10-2020-0030866 A | 3/2020 |
| KR | 10-2020-0068941 A | 6/2020 |
| KR | 10-2020-0078047 A | 7/2020 |
| KR | 10-2021-0001414 A | 1/2021 |
| KR | 10-2021-0044564 A | 4/2021 |
| KR | 10-2021-0097493 A | 8/2021 |
| KR | 10-2022-0060397 A | 5/2022 |
| WO | 2014/102882 A1 | 7/2014 |

OTHER PUBLICATIONS

Search Report (PCT/ISA/210) issued Mar. 25, 2022 by the International Searching authority for International Patent Application No. PCT/KR2021/018282.

* cited by examiner

ELECTRONIC DEVICE AND METHOD FOR PERFORMING GARBAGE COLLECTION

CROSS-REFERENCE TO RELATED APPLICATIONS

This application is a by-pass continuation application of International Application No. PCT/KR2021/018282, filed on Dec. 3, 2021, which is based on and claims priority to Korean Patent Application No. 10-2020-0168751, filed on Dec. 4, 2020, in the Korean Intellectual Property Office, the disclosures of which are incorporated by reference herein their entireties.

BACKGROUND

1. Field

One or more embodiments of the disclosure relate to a technology for storing data by an electronic device performing a garbage collection operation.

2. Description of Related Art

Electronic devices such a smartphone or a tablet may include a data storage device. For example, the electronic device may include a main memory (for example, a random access memory (RAM)) and a large storage device.

Android, which is a mobile operating system, applies a log-structured file system (LFS). Further, a mobile device uses a NAND flash storage device to store system data and user data.

Since the log-structured file system and the NAND flash storage device do not allow in-place updating, a garbage collection operation may be performed to prepare a memory space for data writing. The garbage collection operation is performed as a background operation when a predetermined period and/or an available storage space reach a threshold. Garbage collection includes reading valid data stored in a storage space in one erase unit and writing the valid data in another storage space. The size of valid data written in another storage space is proportional to the cost of garbage collection.

Invalid data may be erased without being transmitted to another storage space during collection. It takes relatively much time for the storage device to write valid data in another storage space and erase data in units of erase, and each storage space has a limited number of erase cycles.

Hot/cold data may indicate a data retention time. For example, hot data is data to be deleted or updated soon and may indicate data having a short retention period. Cold data may indicate data which has not been updated after initial write (storage) and has a long retention period.

An operating system and an application which store data with separating and storing the hot/cold data may have performance degradation according to the elapse of time. Further, the lifespan of a memory may become much shorter. In one embodiment, if the hot/cold data are separated and stored, the device durability and performance may increase.

For example, a storage device may write the hot/cold data in the same unit storage space without separation. When the hot/cold data are written in the same unit storage space, data within the storage space may have different lifespans. Accordingly, as valid data (which is not required to be erased) or invalid data (which may be erased but is not required to be written) is included in the entire erase unit storage space, the garbage collection cost and the garbage collection overhead of the electronic device may increase.

For example, when the hot/cold data are stored without accurate separation, high data I/O latency and low I/O performance may be caused due to the frequent garbage collection and the high garbage collection cost.

SUMMARY

According to an aspect of the disclosure, an electronic device includes: a storage device including a plurality of segments configured to store data; a buffer memory configured to store segment attributes corresponding to the plurality of segments, respectively; and at least one processor electrically connected to the storage device and the buffer memory. The at least one processor is configured to: determine, based on two or more parameters related to a data requested to be written, a data attribute; store the data requested to be written in a segment of the plurality of segments, the segment being corresponding to the data attribute among the plurality of segments; store a segment attribute of the segment, the segment attribute being determined based on the data attribute in the buffer memory; update the data attribute, based on at least a data modification time of the data requested to be written; and update the segment attribute, based on the updated data attribute.

According to another aspect of the disclosure, a method performed by an electronic device, including: determining, based on two or more parameters related to a data requested to be written, a data attribute; storing the data requested to be written in a segment of a plurality of segments, the segment being corresponding to the data attribute; and storing a segment attribute of the segment, the segment attribute being determined based on the data attribute.

An electronic device and a method of operating the same according to one or more embodiments of the disclosure may determine a data attribute on the basis of a plurality of parameters related to a file data attribute and calibrate an incorrectly determined data attribute. Accordingly, the electronic device and the method of operating the same according to the disclosure may perform operation of classifying the file data attribute, which has improved accuracy.

An electronic device and a method of operating the same according to one or more embodiments of the disclosure may reduce the garbage collection cost and the garbage collection overhead by calibrating the file data attribute. Further, an electronic device according to an embodiment of the disclosure may have the high I/O performance and improved lifespan of the electronic device by reducing the garbage collection cost and the number times the garbage collection is performed.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
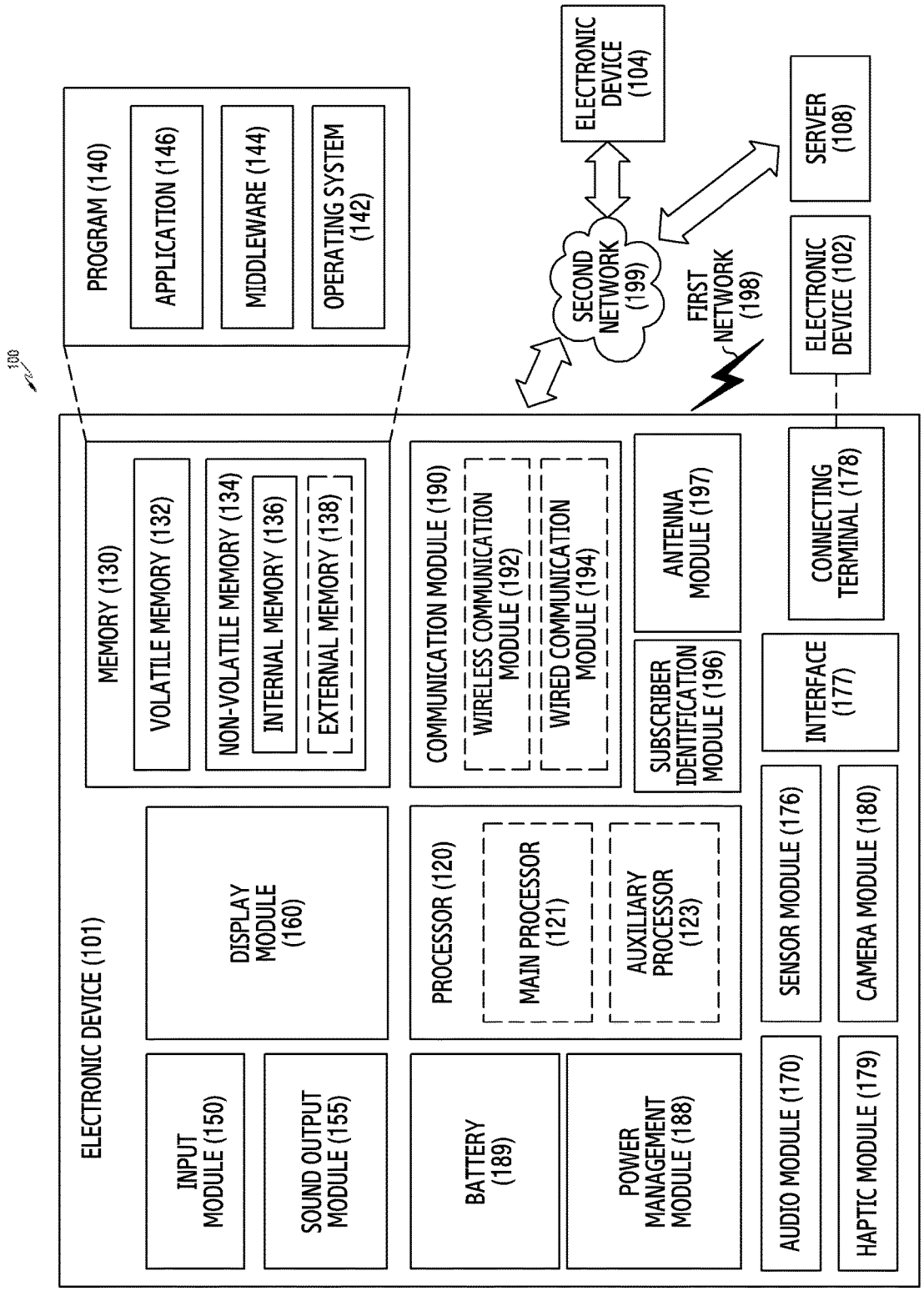
FIG. 1 illustrates an electronic device within a network environment according to an embodiment.

FIG. 1 is a block diagram illustrating an electronic device 101 in a network environment 100 according to one or more embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

In one embodiment, the auxiliary processor 123 may control at least some of functions or states related to at least one component (e.g., the display module 160, the sensor module 176, or the communication module 190) among the components of the electronic device 101, while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196. The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) may be additionally formed as part of the antenna module 197. According to one or more embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108.

For example, if the electronic device 101 may perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

Figure 2:
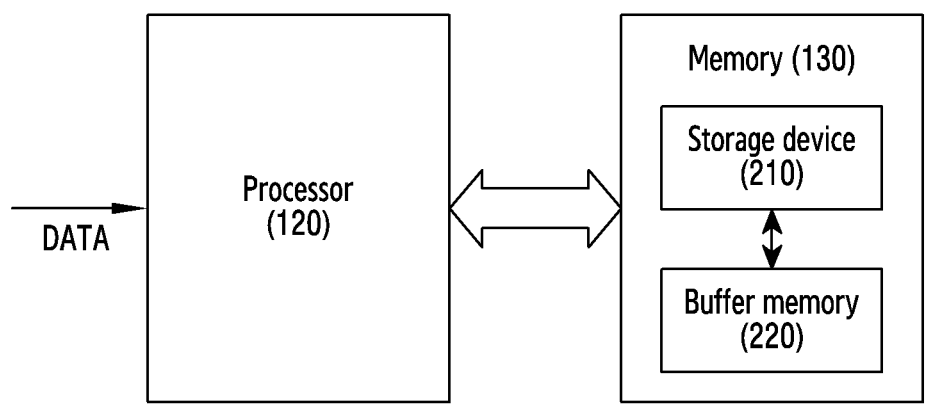
FIG. 2 illustrates the electronic device according to an embodiment.

FIG. 2 is a block diagram illustrating an electronic device according to an embodiment.

Referring to FIG. 2, the electronic device 101 according to an embodiment may include the processor 120 and/or the memory 130. According to an embodiment, the memory 130 may include a buffer memory 220 and/or a storage device 210. For example, the buffer memory 220 may be a volatile memory (for example, the volatile memory 132 of FIG. 1). For example, the storage device 210 may be the nonvolatile memory (for example, the non-volatile memory 134 of FIG. 1). In one or more embodiments, the electronic device 101 may include an additional element in FIG. 2.

According to an embodiment, the processor 120 (for example, the processor 120 of FIG. 1) may execute calculations or data processing for the control and/or communication of at least one other element of the electronic device 101 by using instructions stored in the memory (for example, the memory 130 of FIG. 1). According to an embodiment, the processor 120 may include at least one of a central processing unit (CPU), a graphics processing unit (GPU), a micro controller unit (MCU), a sensor hub, a supplementary processor, a communication processor, an application processor, an application specific integrated circuit (ASIC), and field programmable gate arrays (FPGA) and may have a plurality of cores.

According to an embodiment, the processor 120 may increase an available space of the electronic device 101 through garbage collection for the electronic device 101. For example, when the available space of the electronic device 101 is equal to or smaller than a reference value, the processor 120 may perform garbage collection for the electronic device 101. The processor 120 may retrieve memory resources of unnecessary areas included in the electronic device 101 to increase the available space of the electronic device 101. According to another embodiment, the processor 120 may perform the garbage collection operation on the basis of the control of a controller included in the electronic device 101.

According to an embodiment, the storage device 210 may be manufactured as one of various types of storage devices according to an interface of the processor 120. When the electronic device 101 is based on the log-structured file system, the storage device 210 may divide a total storage space to have a predetermined size and use the same as log units. The log unit may be referred to as a segment. The storage device 210 according to an embodiment may include a plurality of segments, and each segment may include a plurality of blocks. According to an embodiment, the storage device 210 may perform a read operation and a write operation for data in units of blocks, and perform an erase operation in units of segments.

According to one or more embodiments, units of the write operation, the reading, and/or the erase operation related to data may vary depending on the type of the electronic device 101. For example, when the storage device 210 is the NAND flash storage device, the storage device 210 may include a plurality of memory blocks, and each memory block may include a plurality of pages. In an embodiment, the page may be a unit of storing data in the electronic device 101 or reading the stored data, and the block may be a unit of erasing data.

The segment according to one or more embodiments of the disclosure may correspond to a memory block of the storage device, and the block of the storage device 210 may correspond to a page of the NAND flash storage device. In one embodiment, the electronic device 101 applies the log=structure file system.

According to an embodiment, the processor 120 may predefine the type of an attribute of data. According to one or more embodiments, the processor 120 may variously define the type of the data attribute. Accordingly, the data attribute may correspond to one of various types of data attributes. For example, the processor 120 may define the data attribute by hot/cold data on the basis of the number of accesses to data. Alternatively, the processor 120 may define an update period attribute (for example, 1, 2, 4, 5, and the like) on the basis of an update period of data.

According to an embodiment, the processor 120 may predefine the type of a segment attribute. According to one or more embodiments, the processor 120 may variously define the type of the segment attribute. Accordingly, the data attribute may correspond to one of various types of data attributes. For example, the processor 120 may define the segment attribute by hot/cold segments on the basis of the number of times access to the segment is performed. According to an embodiment, the processor 120 may predefine the type of various segment attributes on the basis of the type of various data attributes. For example, the processor 120 may predefine the type of the data attribute and determine the attribute of the segment in which the data is stored according to the type of the data attribute.

According to an embodiment, the processor 120 may receive a data (for example, file data) write request from an external system (for example, an application). According to an embodiment, the processor 120 may determine an attribute of the data requested to be written in response to the write request. The processor 120 may configure a plurality of parameters related to the attribute of the data and determine the attribute of the data on the basis of the plurality of parameters of the data requested to be written. For example, the processor 120 may determine whether the data requested to be written corresponds to a first attribute among a plurality of data types or corresponds to a second attribute different from the first attribute. For example, the processor 120 may determine whether the data requested to be written is hot data or cold data. Hereinafter, hot data and cold data may be described as attributes of the data.

The processor 120 according to an embodiment may determine the attribute of the data requested to be written and control the storage device 210 to store the data requested to be written on the basis of the attribute of the data. For example, the processor 120 may transmit a block write request to the storage device 210 to store the data in a segment of the plurality of segment. The segment may correspond to the data attribute. According to an embodiment, an operation of storing data may be expressed as a data write operation and/or a program operation. Detailed content related to the operation of the processor 120 is described with reference to FIG. 3 and FIGS. 6 to 8.

The memory 130 according to an embodiment may include the buffer memory 220. According to an embodiment, the buffer memory 220 may store system data. For example, the buffer memory 220 may store the data attribute stored in the storage device 210 and information on blocks and segments included in the storage device 210. According to an embodiment, the information on the block and segments may include various pieces of information. For example, the buffer memory 220 may include the data attribute stored in each segment and attribute information of each segment. The buffer memory 220 may store hot/cold segment attribute information according to the data type stored in the segment. According to an embodiment, the buffer memory 220 may read and store system data stored in the storage device 210 when power is applied.

According to an embodiment, the processor 120 may store the attribute of the data requested to be written and/or the attribute of the segment in which the data requested to be written is stored in the buffer memory 220. According to an embodiment, the processor 120 may determine the attribute of the data requested to be written and determine a segment to store the data requested to be written on the basis of the segment attribute stored in the buffer memory 220.

According to an embodiment, attributes of some of the data stored in respective segments of the storage device 210 may be incorrectly determined or the data attribute may be changed. For example, data determined as hot data by the processor 120 may be cold data. Alternatively, data determined as cold data by the processor 120 may be hot data. According to an embodiment, the processor 120 may change the attribute of the data stored in each segment and change the segment attribute on the basis of the changed data attribute. According to an embodiment, the processor 120 may store the changed attributes of the data and/or segment in the buffer memory 220. An operation of calibrating the attribute by the processor 120 according to an embodiment is described below with reference to FIG. 10.

Figure 3:
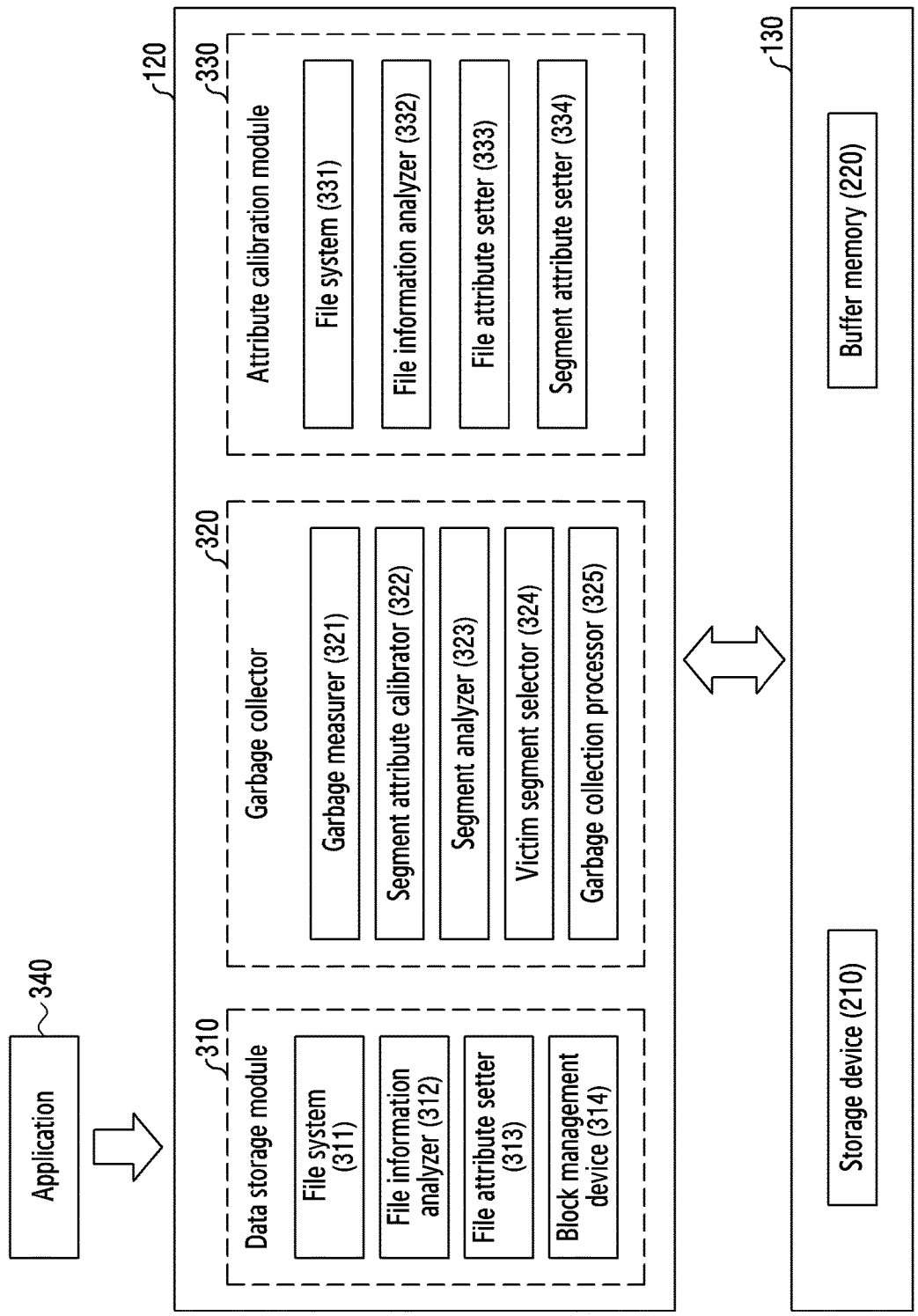
FIG. 3 illustrates a processor of the electronic device according to an embodiment.

FIG. 3 is a diagram illustrating the process of the electronic device according to an embodiment.

Referring to FIG. 3, the processor 120 may use hardware and/or software modules to store various pieces of data and support garbage collection functions. For example, the processor 120 may operate a data storage module 310, a garbage collector 320, and/or an attribute calibration module 330 by executing instructions stored in the memory 130. In one or more embodiments, software modules different from those illustrated in FIG. 3 may be implemented. For example, at least two modules may be integrated into one module or one module may be divided into two or more modules. Further, hardware and software modules may share one function to improve the task performance.

In an embodiment, the data storage module 310 may include a file system 311, a file information analyzer 312, a file attribute configurer 313, and/or a block management device 343. The file system 311 according to an embodiment may manage a request from an external system. For example, the file system 311 may manage a data write request received from an application 340.

According to an embodiment, the file information analyzer 312 may analyze data requested to be written. The file information analyzer 312 may configure a plurality of parameters to analyze the data attribute and extract values corresponding to the plurality of parameters for the data requested to be written. For example, the file information analyzer 312 may extract an extension name and a path name. Further, the file information analyzer 312 may configure a priority of each of the plurality of parameters. For example, the file information analyzer 312 may configure the path name to have a higher priority than the extension name. The file information analyzer 312 according to an embodiment may configure some of the types of extension names of data to have a higher priority than the path name. Extension names having a higher priority than the path name may be expressed as preemptive extension names. That is, the preemptive extension name may indicate an extension name having a higher priority than the path name. In one or more embodiments, the file information analyzer 312 may determine various parameters and configure a priority corresponding to each parameter.

In an embodiment, the file attribute configurer 313 may configure the attribute of data requested to be written on the basis of information of the data analyzed through the file information analyzer 312. For example, when an extension name, a path name, and/or a preemptive extension name of the data requested to be written, analyzed through the file information analyzer 312, indicate hot data, the file attribute configurer 313 may determine the attribute of the data as hot data. Unlike, when the data requested to be written, analyzed through the file information analyzer 312, indicates cold data, the attribute of the data may be determined as cold data. The file attribute configurer 313 according to an embodiment may determine the attribute of the data on the basis of various pieces of file information without limiting to the examples described in the disclosure. The file attribute configurer 313 may determine the attribute of the data requested to be written and store the determined attribute information in the buffer memory 220.

The block management device 314 according to an embodiment may allocate blocks of a segment to store the data on the basis of the attribute of the data requested to be written, determined through the file attribute configurer 313. For example, the block management device 314 may allocate blocks of a segment corresponding to the attribute of the data in order to store the data requested to be written. According to an embodiment, when there is no block of the segment corresponding to the attribute of the data, the block management device 314 may allocate blocks of a free segment and determine an attribute of the free segment. In an embodiment, the block management device 314 may store the attribute information of the segment storing the data determined on the basis of the data requested to be written in the buffer memory 220.

In an embodiment, the buffer memory 220 may store the attribute information of the data and the attribute information of the segment and may be referred to for allocation of the block to store the data in response to a write request. For example, the buffer memory 220 may include information on segment numbers (SEG_1), segment attributes (H/C), and/or segment capacities (Full_inf) as shown in [Table 1] below. The segment attribute (H/C) may indicate cold if data stored in the segment is cold data, indicate hot if the data is hot data, and indicate free if there is no stored data.

TABLE 1

| SEG_1 | H/C | Full_inf |
|---|---|---|
| SEG1 | Hot | Full |
| SEG2 | Hot | Full |
| — | — | — |
| SEGN-1 | Cold | Not Full |
| SEGN | Free | Free |

According to an embodiment, the block management device 314 may read attribute information of the segment stored in the buffer memory 220 in order to allocate a segment block corresponding to the attribute of the data requested to be written. For example, referring to [Table 1], when the attribute of the data requested to be written is configured as cold data, blocks of segment N-1 (SEGN-1) may be allocated with reference to a segment capacity (Not Full) of segment N-1 (SEGN-1) stored in the buffer memory 220 and cold of the segment attribute.

In an embodiment, the attribute calibration module 330 may include a file system 331, a file information analyzer 332, a file attribute configurer 333, and/or a segment attribute configurer 334. The attribute calibration module 330 according to an embodiment may calibrate (update) attribute information of the data stored in the storage device 210. For example, when the attribute of the stored data and the attribute of the segment storing the data are incorrectly determined or the attributes are changed, the attribute calibration module 330 may update attribute information of the data and attribute information of the segment.

According to an embodiment, an operation of updating the attribute information of the data and the segment may be performed at a determined time through the processor 120. Alternatively, the operation of updating the attribute information of the data and the segment may be performed before the generation of a predetermined event (for example, the garbage collection operation) through the processor 120.

The file system 331 according to an embodiment may search for a file stored in the storage device 210. For example, the file system 331 may search for some pieces of data of which attributes are required to be calibrated among the data stored in the storage device 210 or search for all pieces of data. Accordingly, through the attribute calibration module 330, data attributes of all or some pieces of the stored data may be selectively updated.

According to an embodiment, the file information analyzer 332 may perform an operation similar to that of the file information analyzer 312 included in the data storage module 310. For example, the file information analyzer 332 may configure a plurality of parameters to update the data attribute and extract values corresponding to the plurality of parameters for the data stored in the storage device 210. In an embodiment, the file information analyzer 332 may configure parameters different from the plurality of parameters configured by the file information analyzer 312 included in the data storage module 310. For example, the file information analyzer 332 may configure a time information parameter. The time information parameter may indicate a write request time and/or time information indicating access to the data. The file information analyzer 332 may configure a priority of each of the plurality of parameters. For example, the file information analyzer 332 may configure a time information parameter to have the highest (or a higher) priority among parameters related to the attribute of data stored in the storage device 210. In one or more embodiments, the file information analyzer 332 may determine various parameters and configure a priority corresponding to each parameter.

In an embodiment, the file attribute configurer 333 may update the attribute of data stored in the storage device 210 on the basis of information of the data analyzed through the file information analyzer 332. For example, it may be assumed that the attribute of data stored in the storage device 210 is configured as hot data through the file attribute configurer 313 included in the data storage module 310. When time information of the data analyzed through the file information analyzer 332 indicates cold data, the file attribute configurer 333 may configure the attribute of data as cold data. The file attribute configurer 333 according to an embodiment may update the attribute of the data on the basis of various parameters without limiting to the examples described in the disclosure. Further, the file attribute configurer 333 may update the stored attribute of data and store the updated attribute information in the buffer memory 220.

The segment attribute configurer 334 according to an embodiment may update an attribute of blocks and/or segments configured to store data on the basis of the stored attribute of data updated through the file attribute configurer 333. For example, when the stored attribute of data is updated from hot data to cold data, the segment attribute configurer 334 may configure the attribute of the segment including blocks storing the updated data as a cold segment. The segment attribute configurer 334 may store the updated attribute information of the segment in the buffer memory 220. An operation of the attribute calibration module 330 according to an embodiment is described below with reference to FIG. 10.

In an embodiment, the garbage collector 320 may include a garbage measurer 321, a segment attribute calibrator 322, a segment analyzer 323, a victim segment selector 324, and/or a garbage collection processor 325. In another embodiment, the garbage collector 320 may be included in the storage device 210. For example, when a NAND flash-based storage device is used, an element corresponding to the garbage collector 320 may be included in the storage device 210.

The garbage measurer 321 according to an embodiment may measure a ratio of available storage spaces of segments included in the storage device 210 and determine whether to perform the garbage collection operation on the basis of the radio of the available storage spaces. For example, when valid data and invalid data are mixed and the ratio of the available storage spaces is equal to or smaller than a reference value, the garbage measurer 321 may determine that the garbage collection operation is needed.

According to an embodiment, the segment attribute calibrator 322 may calibrate the segment attribute on the basis of segment attribute information updated through the attribute calibration module 330. For example, the segment attribute calibrator 322 may acquire segment attribute information required for performing the garbage collection operation from the buffer memory 220 and calibrate the acquired segment attribute information. According to an embodiment, the segment attribute calibrator 322 may configure attributes of the segments of the storage device 210 as cold, hot, or complex on the basis of the segment attribute information updated through attribute calibration module 330. When the attribute of the segment is determined as complex, data stored in the data may indicate that hot data and cold data are mixed. Among the segment attributes, the complex segment may be expressed as an undefined segment.

According to an embodiment, the segment analyzer 323 may acquire attribute information of segments of the storage device 210 from the segment attribute calibrator 322. The segment analyzer 323 may calculate the cost of garbage collection on the basis of the acquired segment attribute information. When there are segments having the same attribute to calculate the garbage collection cost, the segment analyzer 323 may calculate the garbage collection cost based on the segments having the same attribute. If there is no segments having the same attribute, the garbage collection cost based on segments having different attributes may be calculated.

According to an embodiment, the victim segment selector 324 may acquire the garbage collection cost of each segment from the segment analyzer 323 and select victim segments on the basis of the acquired garbage collection cost and the segment attributes. For example, the victim segment selector 324 may select segments having the lowest (or a lower) garbage collection cost as victim segments among segments having the same attribute which may perform the garbage collection operation.

The garbage collection processor 325 according to an embodiment may perform the garbage collection operation for the victim segments selected through the victim segment selector 324. For example, when a first segment and a second segment are selected as victim segments, the garbage collection processor 325 may store valid data included in each of the first segment and the second segment in a third segment which is a free segment and perform an erase operation for the first segment and the second segment. An operation of the garbage collector 320 is described below with reference to FIG. 11.

Figure 4A:
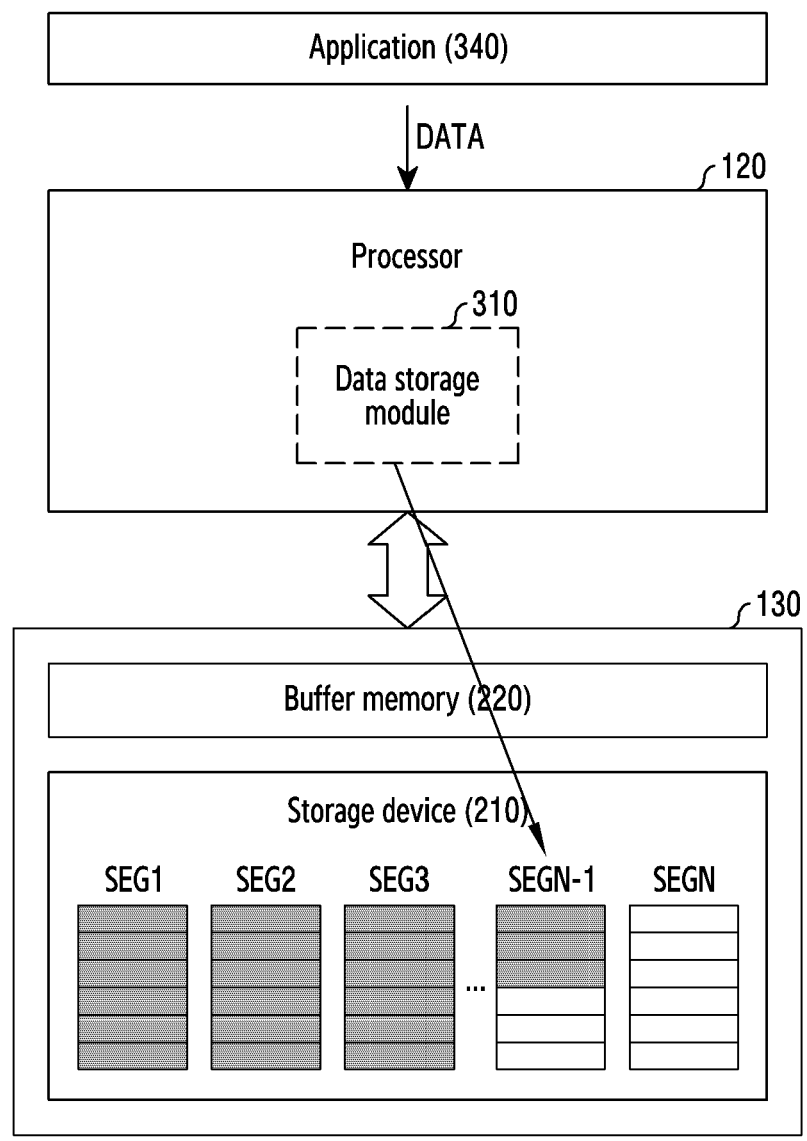
FIG. 4A illustrates a writing operation based on a data attribute according to an embodiment.

FIG. 4A is a diagram illustrating a writing operation based on a data attribute according to an embodiment.

Referring to FIG. 4A, the processor 120 may include the data storage module 310, the memory 130 may include the buffer memory 220 and/or the storage device 210, and the storage device 210 may include first to $N^{th}$ segments (SEG1 to SEGN). The first to $N^{th}$ segments (SEG1 to SEGN) according to an embodiment may include various segments such as a hot segment, a cold segment, and/or a complex segment, and each of the first to the segments (SEG1 to SEGN) may include a plurality of blocks.

In an embodiment, the processor 120 may receive a data write request from the application 340. The processor 120 may determine an attribute of data received through the data storage module 310. For example, when data requested to be written has a short retention period as data that will be deleted or updated soon, the processor 120 may determine the data as hot data.

The data storage module 310 according to an embodiment may refer to the buffer memory 220 in order to allocate blocks to store the data requested to be written. The buffer memory 220 according to an embodiment may include information on the first to $N^{th}$ segments (SEG1 to SEGN). For example, the buffer memory 220 may store information indicating that there is a storage space of the $(N-1)^{th}$ segment (Not Full) and the attribute of the $(N-1)^{th}$ segment is a hot segment. In an embodiment, the data storage module 310 may allocate blocks of the $(N-1)^{th}$ segment having an attribute that is the same as the data attribute on the basis of information indicating that the data attribute of the data requested to be written is the hot data and may transmit a data write request to the storage device 210.

In an embodiment, the storage device 210 may write (store) the data requested to be written in the block of the $(N-1)^{th}$ segment on the basis of the write request of the data storage module 310. In one embodiment, the attribute of the data requested to be written may be hot data. In another embodiment, the attribute of the data requested to be written may be cold data.

Figure 4B:
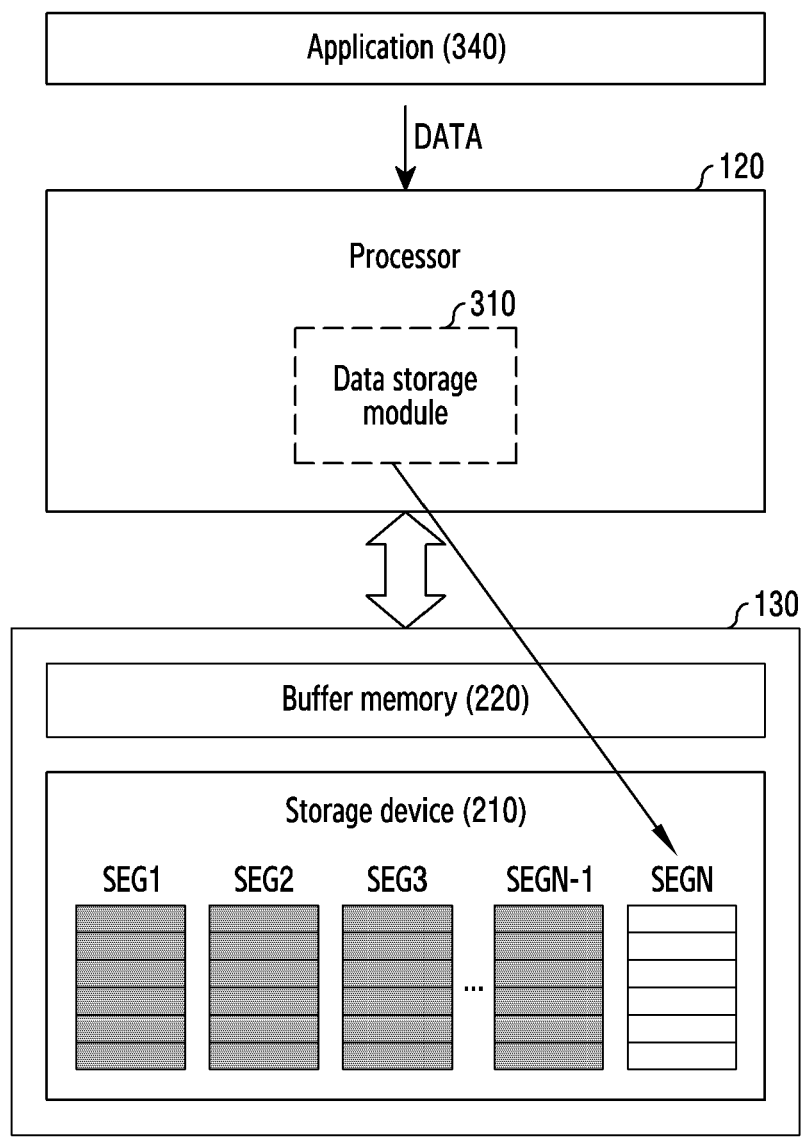
FIG. 4B illustrates a write operation based on the data attribute according to an embodiment.

FIG. 4B is a diagram illustrating a write operation based on the data attribute according to an embodiment.

Referring to FIG. 4B, the processor 120 may receive a data write request from the application 340. The processor 120 may perform the operation which is the same as the operation described with reference to FIG. 4A in order to store the data requested to be written. For example, the attribute of the data requested to be written may be determined as hot data and the buffer memory 220 may be referred to therefor.

In an embodiment, the buffer memory 220 may include available storage space information for first to $N^{th}$ segments (SEG1~SEGN). For example, the buffer memory 220 may include information indicating the first to $(N-1)^{th}$ segments (SEG1~SEGN-1) have no more available space to store data, and the $N^{th}$ segment (SEGN) has a space to store data as a free segment. In an embodiment, the data storage module 310 may determine that the attribute of the data requested to be written is hot data and determine there is no available space in the hot segment with reference to the buffer memory 220. Accordingly, the data storage module 310 may allocate the block of the $N^{th}$ segment (SEGN) corresponding to a free segment which does not store data and transmit a data write request to the storage device 210. According to an embodiment, the data storage module 310 may configure the segment attribute of the $N^{th}$ segment as a hot segment according to storage of the hot data in the $N^{th}$ segment.

Figure 5A:
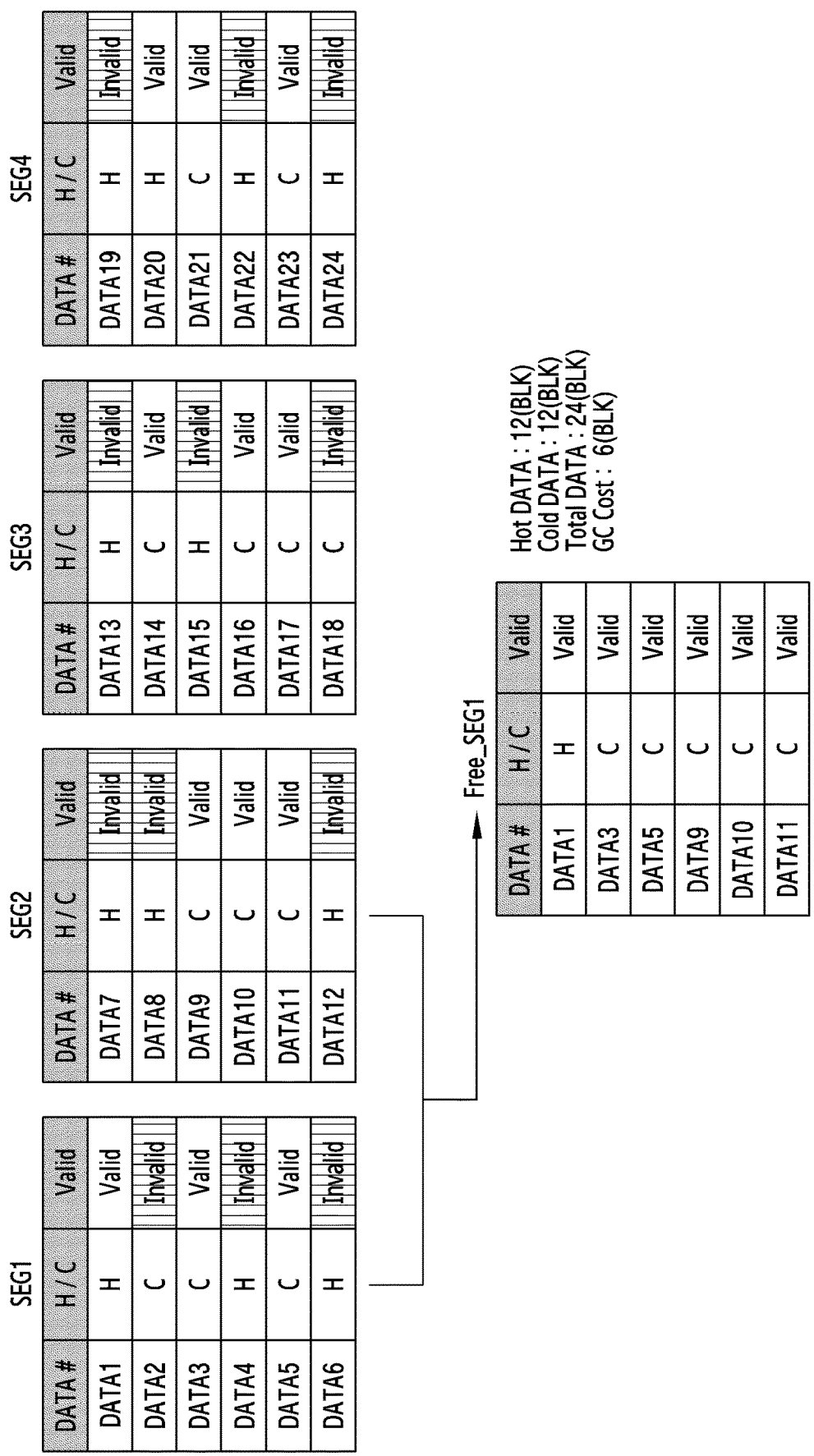
FIG. 5A illustrates a garbage collection operation according to a comparative embodiment.

FIG. 5A is a diagram illustrating the garbage collection operation according to a comparative embodiment.

Referring to FIG. 5A, the garbage collection operation of the memory that is not classified according to the data attribute may be described. First to fourth segment information (SEG1 to SEG4) may indicate segment information for first to fourth segments included in the storage device 210. For example, the segment information may indicate data (DATA1) stored in each segment, an attribute of each piece of data (H/C), and/or validity of invalidity of data.

The processor 120 (for example, the processor 120 of FIG. 1) may store the first to fourth segment without classifying data requested to be written according to a data attribute. For example, the processor 120 may sequentially store first to twenty fourth data (DATA1 to DATA24) in the first to fourth segments according to the order of the data write request.

The processor 120 may perform the garbage collection operation according to a predetermined event (for example, a data storage space equal to or smaller than a predetermined ratio) or elapse of a predetermined time. The processor 120 may select victim segments to perform the garbage collection operation and perform the garbage collection operation. For example, a first segment and a second segment may be determined as victim segments, and valid data (DATA1, DATA3, DATA5, and DATA9 to DATA11) of the first to second segments may be copied to a new free segment (Free SEG1). Thereafter, the processor 120 may secure free segments by performing an erase operation for the victim segments. The garbage collection cost may be proportional to the capacity of valid data copied to the free segment. For example, when the number of pieces of valid data is 6, the garbage collection cost may be measured as 6. According to an embodiment, the unit of data and the unit of garbage collection costs may be expressed as a block unit.

As described with reference to FIG. 5, when the size of hot data stored in the segment is 12 (BLK) and the size of cold data is 12 (BLK), the garbage collection cost may be indicated as 6 (BLK) if the garbage collection operation is performed with the first segment and the second segment as victim segments. Accordingly, when the attribute of data is stored without any classification, the garbage collection cost may be relatively high and garbage collection overhead may increase.

Figure 5B:
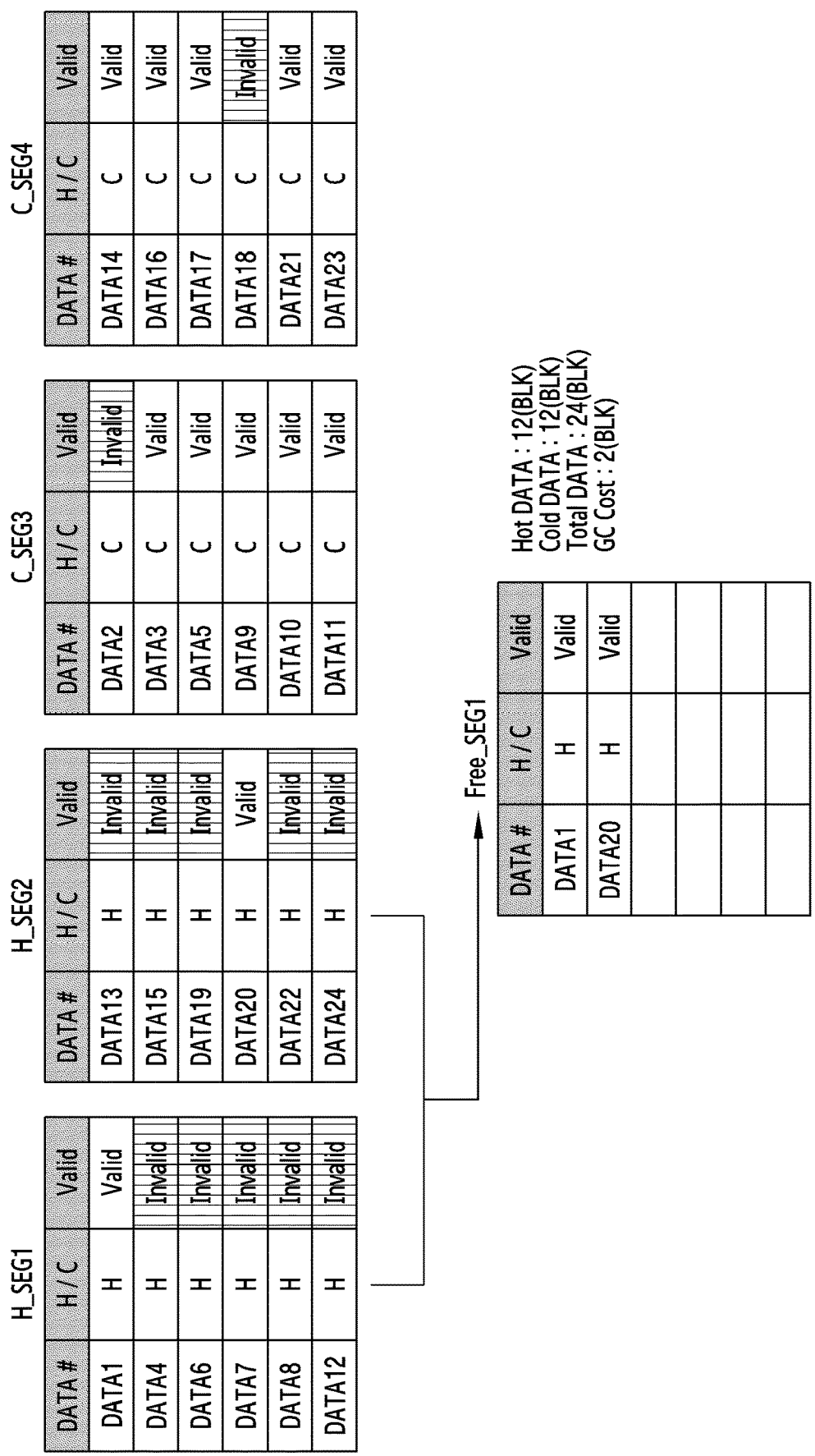
FIG. 5B illustrates another garbage collection operation according to an embodiment.

FIG. 5B is a diagram illustrating another garbage collection operation according to an embodiment.

Hereinafter, the garbage collection operation of the stored memory classified according to the data attribute is described with reference to FIG. 5B.

According to an embodiment, the processor 120 (for example, the processor 120 of FIG. 1) may classify and store an attributes of data requested to the written. For example, the processor 120 may store hot data in a first segment and a second segment and cold data in a third segment and a fourth segment. In an embodiment, segment attributes of the first to fourth segments may be determined according to attributes of data stored in the respective segments. For example, the first segment and the second segment may indicate hot segments, and the third segment and the fourth segment may indicate cold segments.

According to an embodiment, the processor 120 may select victim segments from among segments having the same segment attribute in order to perform the garbage collection operation and perform the garbage collection operation. For example, the processor 120 may determine the first segment and the second segment having the same segment attribute as victim segments. The processor 120 according to an embodiment may copy valid data (DATA1 and DATA20) included in the first segment and the second segment corresponding to hot segments to a new free segment (Free SEG1). The processor 120 may perform an erase operation for the victim segments, so as to secure free segments.

The processor 120 according to an embodiment may calculate the garbage collection cost to determine victim segments. Further, the processor 120 may determine segments having the lowest (or a lower) garbage collection cost among the segments having the same attribute as victim segments. For example, the processor 120 may determine the first segment and the second segment of which the garbage collection cost is measured as 2 (BLK) among the first segment and the second segment having the same segment attribute and the third segment and the fourth segment having the same segment attribute.

According to an embodiment, the size of hot data stored in the segment may be 12 (BLK) and the size of cold data may be 12 (BLK). When the attribute of each piece of data is classified and stored and segments having the same segment attribute are determined as victim segments, the garbage collection cost may be indicated as 2 (BLK). Accordingly, when the garbage collection operation according to an embodiment is performed, the electronic device 101 may have the relatively low garbage collection cost compared to the case in which the garbage collection operation of the comparative embodiment of FIG. 5A is performed and may have reduced garbage collection overhead.

Figure 6:
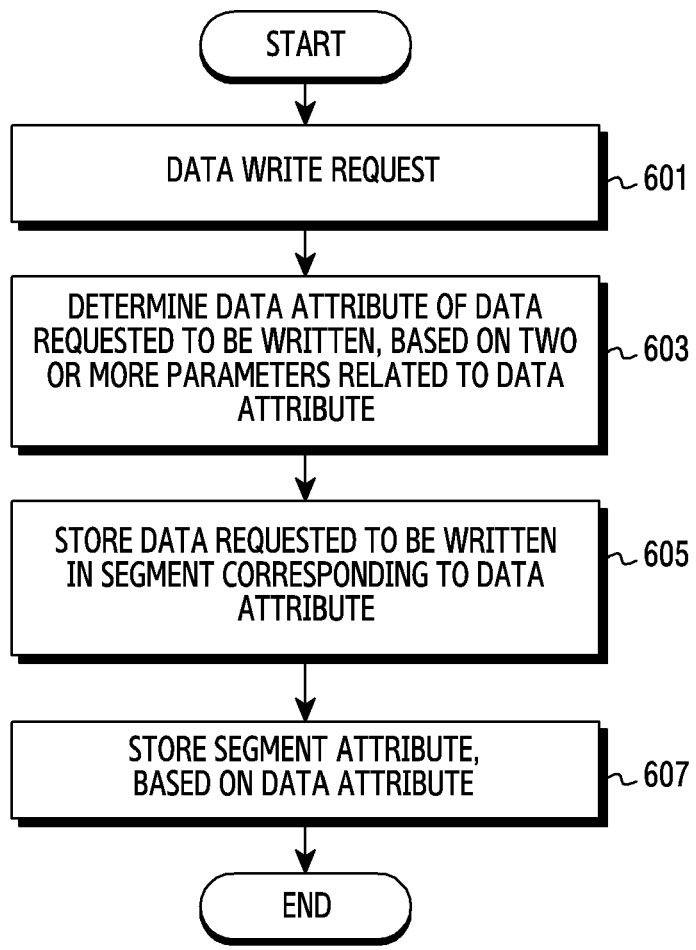
FIG. 6 illustrates a method of operating the electronic device according to an embodiment.

FIG. 6 is a flowchart illustrating a method of operating the electronic device according to an embodiment.

Referring to FIG. 6, the processor 120 (for example, the processor 120 of FIG. 1) of the electronic device 101 may receive a data (for example, file data) write request from an external system (for example, the application) in operation 601.

The processor 120 according to an embodiment may determine two or more parameters related to a data attribute of the data requested to be written and determine the attribute of the data requested to be written on the basis of the two or more parameters in operation 603. For example, the processor 120 may determine the attribute of the data requested to be written as hot data or cold data on the basis of the two or more parameters.

According to an embodiment, the electronic device 101 may perform a write operation for the data in a segment of the plurality of segments. The segment may correspond to the attribute of the data requested to be written in operation 605. For example, the processor 120 may allocate blocks of the segment corresponding to the attribute of the data requested to be written and transmit a block write request to the storage device 210 (for example, the memory 130 of FIG. 1). Accordingly, the storage device 210 may perform the data write operation on the basis of the block write request. The data requested to be written may be stored in the segment corresponding to the data attribute in operation 605. According to an embodiment, the processor 120 may read segment attribute information stored in the buffer memory 220 in order to refer to a segment attribute.

According to an embodiment, the electronic device 101 may store the attribute of the segment. The attribute may be determined on the basis of the stored data attribute in operation 607. For example, the processor 120 may store the segment attribute information in the buffer memory 220. The processor 120 may store the segment attribute as a hot segment if the stored data attribute is hot data and store the segment attribute as a cold segment if the data attribute is cold data.

Figure 7:
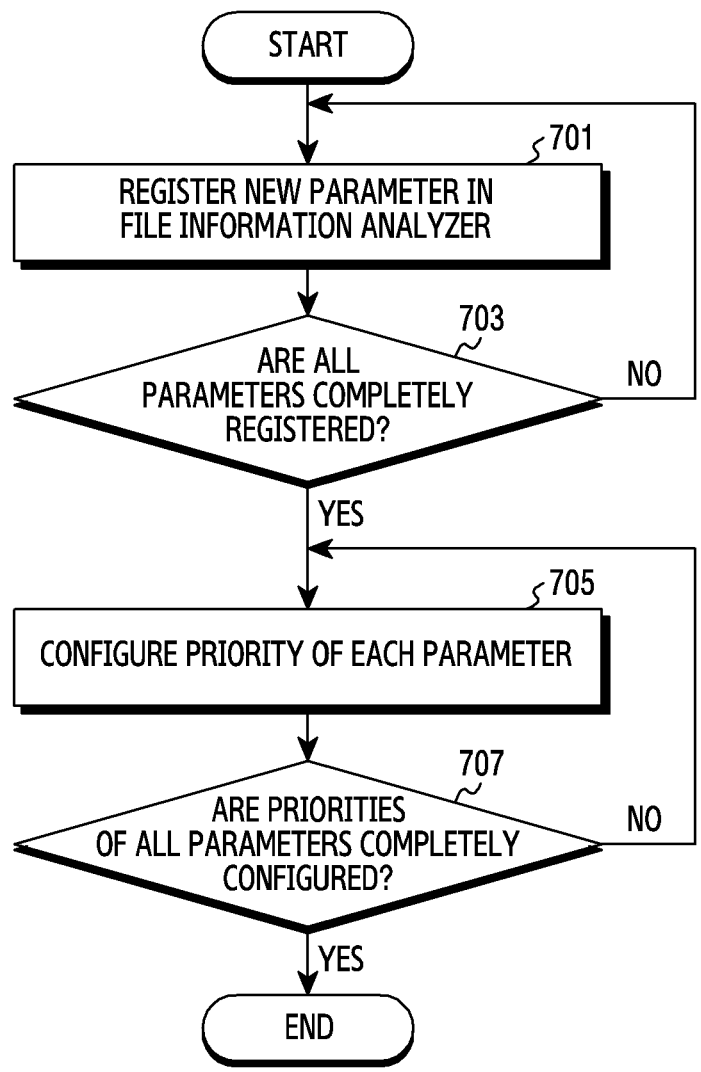
FIG. 7 illustrates an operation in which the electronic device configures parameters according to an embodiment.

FIG. 7 is a flowchart illustrating an operation in which the electronic device configures parameters according to an embodiment.

Referring to FIG. 7, in operation 701, the electronic device 101 may register a plurality of parameters related to data attributes and configure each of the plurality of parameters to have a priority. According to an embodiment, the file information analyzer 312 included in the processor 120 may register the plurality of parameters for determining data attributes. For example, a path name, an extension name, and/or a preemptive extension name of data may be registered as parameters. Further, a hot/cold attribute of a value of each parameter may be configured. For example, the path name may be configured as hot data when the path name of data is '/system/cache', and configured as cold data when the path name is '/camera/DCIM'. The extension name of data may be configured as hot data when the extension name is 'tmp or bak' and configured as cold data when the extension name is 'mp4 or jpg'.

According to the disclosure, the electronic device 101 may be not limited to the example and may register various types of parameters, and an attribute value corresponding to each parameter may be changed.

According to an embodiment, the processor 120 may identify whether all parameters are registered in operation 703. When not all the parameters are registered, the processor may repeatedly perform operation 701 to register all the configured parameters.

According to an embodiment, the processor 120 may configure a priority of each of the registered parameters in operation 705. For example, the processor 120 may configure the path name to have a higher priority than the extension name. According to an embodiment, the processor 120 may configure some extension names to have a higher priority than the path name. As described above, the extension name having a higher priority than the path name may be expressed as a preemptive extension name (for example, db).

According to an embodiment, the processor 120 may identify whether the priorities of all parameters are configured in operation 707. When not all the parameter priorities are configured, the processor 120 may repeatedly perform operation 705 to configure priorities of all the configured parameters.

According to the disclosure, the electronic device 101 may configure the priorities without limiting to the example.

Figure 8:
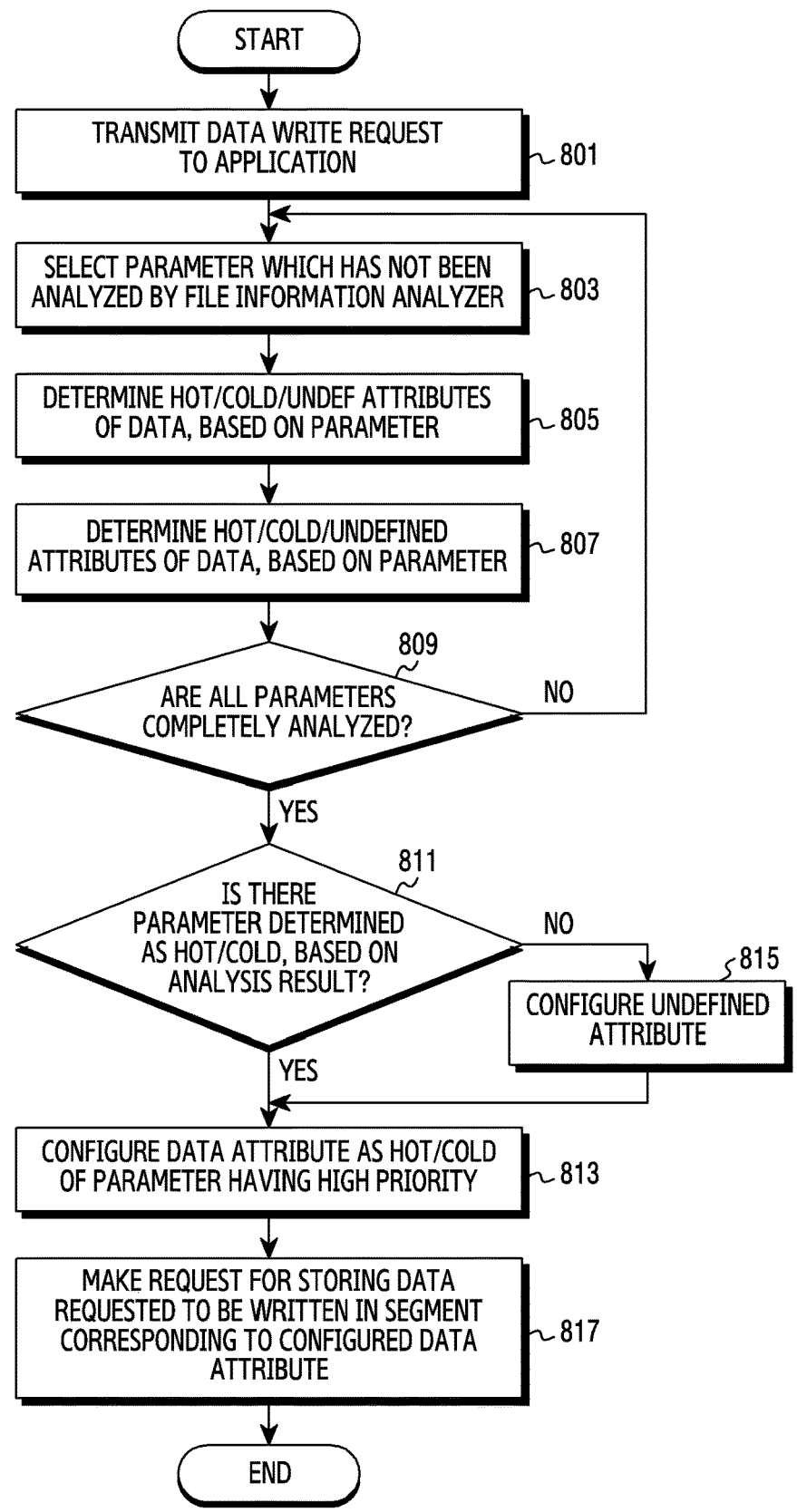
FIG. 8 illustrates an operation in which the electronic device stores data according to an embodiment.

FIG. 8 is a flowchart illustrating an operation in which the electronic device stores data according to an embodiment.

Referring to FIG. 8, in operation 801, the processor 120 (for example, the processor 120 of FIG. 1) may receive a data (for example, file data) write request from the application.

According to an embodiment, in connection with a requested data attribute, the processor 120 may select parameters which have not been analyzed among a plurality of parameters by the file information analyzer 312 in operation 803. For example, when data attributes based on an extension name and a preemptive extension name are determined and a data attribute based on a path name is not determined, the file information analyzer 312 may select the path name as the parameter which has not been analyzed.

According to an embodiment, in operation 805, the processor 120 may determine the data attribute on the basis of the parameter which has not been analyzed by the file information analyzer 312. For example, when the parameter which has not been analyzed is a path name parameter, the processor 120 may determine which one of hot data, cold data, or undefined data is the data attribute on the basis of the path name of the requested data. According to an embodiment, undefined data may indicate the case in which there is no corresponding parameter in the file information analyzer 312 or no data attribute corresponding to the parameter is configured.

In connection with the requested data, the processor 120 according to an embodiment may determine whether data attributes for all parameters registered in the file information analyzer 312 are analyzed in operation 807. When not all the parameters are analyzed, the processor 120 may repeatedly perform operation 803 to operation 805.

According to an embodiment, in operation 809, the processor 120 may determine whether there is a parameter determined as hot data or cold data. When there is no parameter determined as hot data or cold data among the plurality of parameters, the processor 120 may configure the attribute of the requested data as undefined data in operation 813.

According to an embodiment, in operation 811, there may be a parameter determined as hot data or cold data among the plurality of parameters. In this case, the processor 120 may configure the data attribute on the basis of a parameter having a high priority among parameters determined as hot data or cold data. For example, in connection with the attribute of the requested data, an extension name parameter may be determined as hot data and a path name parameter may be determined as cold data. In this case, the processor 120 may determine the attribute of the requested data as cold data on the basis of the data attribute of the path name parameter having a higher priority among the extension name parameter and the path name parameter.

According to an embodiment, in operation 815, the processor 120 may make a request for storing data requested to be written in a segment of the plurality of segments. The segment may correspond to a data attribute to the storage device 210 (for example, the memory 130 of FIG. 1). For example, when it is determined that the data attribute is cold data, the processor 120 may allocate blocks to a cold segment and make a request for storing (writing) the same to the storage device 210. In another example, when it is determined that the data attribute is hot data, the processor 120 may allocate blocks to a hot segment and make a request for storing (writing) the same to the storage device 210.

According to another embodiment, when there is no open segment corresponding to the data attribute, the processor 120 may allocate blocks to a free segment in operation 815. The attribute of the segment including allocated blocks may be configured on the basis of the data attribute. For example, in order to store hot data, the processor 120 may allocate blocks of the free segment and configure the attribute of the free segment as the hot segment. In an embodiment, the segment configured as the hot segment may store hot data.

Figure 9:
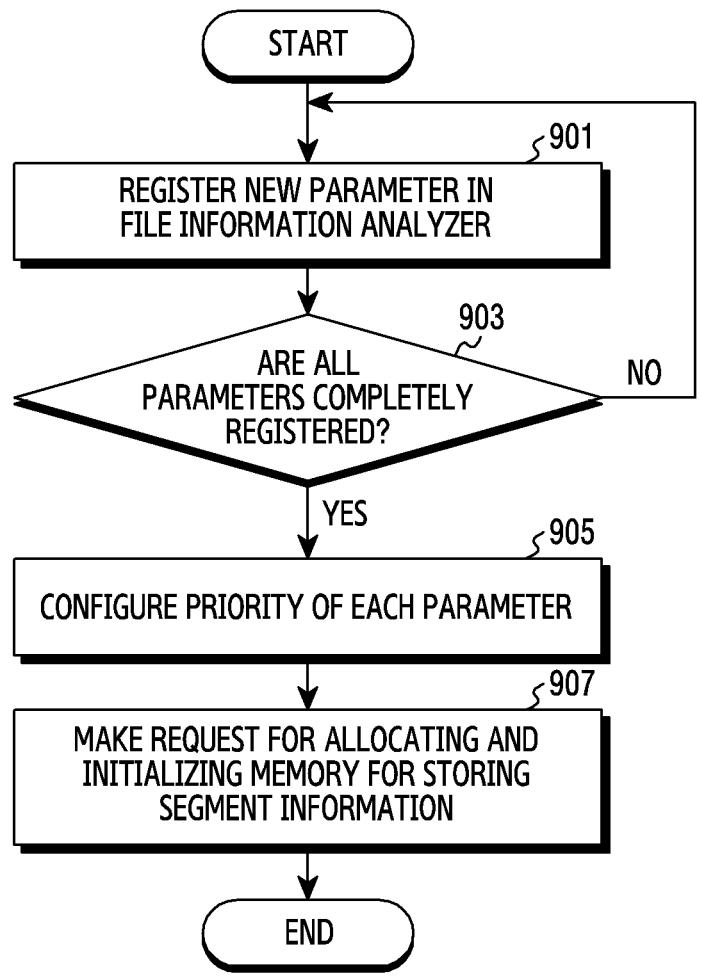
FIG. 9 illustrates a configuration of an additional parameter by an electronic device according to an embodiment.

FIG. 9 is a flowchart illustrating a configuration of an additional parameter by an electronic device according to an embodiment.

Referring to FIG. 9, in operation 901, the electronic device 101 may register a new parameter different form a plurality of parameters configured in the file information analyzer 332. In an embodiment, the file information analyzer 332 may include a plurality of parameters of the file information analyzer 312 included in the data storage module 310 described with reference to FIG. 3. For example, the file information analyzer 332 included in the processor 120 may register a path name, an extension name, and/or a preemptive extension name of data as parameters. In addition, the file information analyzer 332 may register a time information parameter as a new parameter. In one or more embodiments, the time information parameter may indicate various pieces of information without any limitation. For example, the time information parameter may indicate the number of reads for data, the number of updates of data, and/or a difference between a data storage time and a last update time.

According to an embodiment, the file information analyzer 332 may configure a hot/cold attribute of a newly registered parameter value. For example, when the newly registered parameter is a time information parameter, the file information analyzer 332 may configure cold data if the difference between the last update time and the data storage time is larger than or equal to a predetermined reference value.

According to an embodiment, the processor 120 may identify whether all parameters are registered in operation 903. When not all the parameters are registered, the processor 120 may repeatedly perform operation 901 to register all the configured parameters.

According to an embodiment, the processor 120 may configure priorities of all the registered parameters in operation 905. For example, the processor 120 may first configure the priority of the parameter newly registered in the file information analyzer 332. Accordingly, when the difference between the data storage time and the last update time is larger than or equal to the reference value, the data attribute may be determined on the basis of the time information parameter which is the first priority parameter regardless of attributes of other parameters.

According to an embodiment, the processor 120 may store information on a plurality of segments included in the storage device 210 (for example, the memory 130 of FIG. 1) in operation 907. For example, the processor 120 may control the buffer memory 220 to store information on the plurality of segments. According to an embodiment, in operation 907, the processor 120 may initialize segment information included in the buffer memory 220. In another embodiment, the processor 120 may initialize information on some segments among the segment information included in the buffer memory 220.

Figure 10:
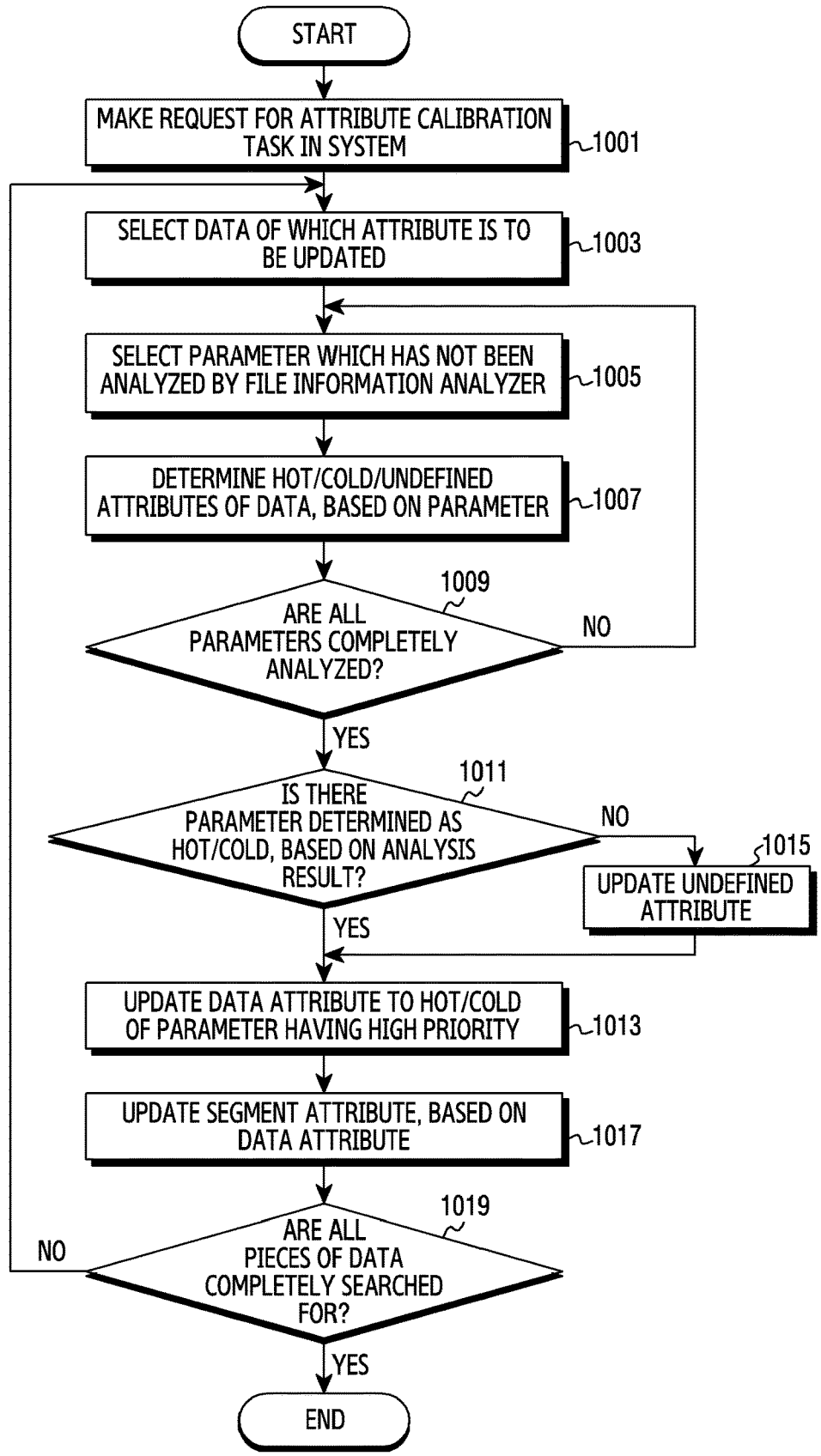
FIG. 10 illustrates an operation in which the electronic device calibrates segment attributes according to an embodiment.

FIG. 10 is a flowchart illustrating an operation in which the electronic device calibrates segment attributes according to an embodiment.

Referring to FIG. 10, in operation 1001, the system may make a request for an attribute update task to the processor 120 (for example, the processor 120 of FIG. 1). For example, the external system may make a request for an attribute calibration task to the processor 120 in order to calibrate data and segment attributes before performing the garbage collection operation. According to another embodiment, the processor 120 may perform the attribute update task on a predetermined time period regardless of a request of the system.

According to an embodiment, in operation 1003, the processor 120 may select data of which an attribute is to be updated among data stored in the storage device 210 (for example, the memory 130 of FIG. 1). For example, the processor 120 may select all the data stored in the storage device 210. In another example, the processor 120 may select some of the data stored in the storage device 210.

The processor 120 according to an embodiment may select a parameter which has not been analyzed from among a plurality of parameters related to the data attribute selected to be updated, by the file information analyzer 332 in operation 1005. For example, when the data attribute is determined on the basis of an extension name, a path name, and a preemptive extension name and the data attribute based on time information is not determined, the file information analyzer 332 may select time information as the parameter which has not been analyzed.

According to an embodiment, the processor 120 may determine the data attribute on the basis of the selected parameter in operation 1007. For example, when the time information parameter is selected as the parameter which has not been analyzed, the data attribute may be determined on the basis of time information of data. At this time, the data attribute may be determined as one of hot data, cold data, and/or undefined data on the basis of the time information parameter. According to an embodiment, the undefined data may indicate the case in which there is no corresponding parameter in the file information analyzer 332 or no data attribute corresponding to the parameter is configured.

According to an embodiment, in connection with data selected to be updated, the processor 120 may determine whether data attributes for all parameters configured in the file information analyzer 332 are analyzed in operation 1009. When not all the parameters are analyzed, the processor 120 may repeatedly perform operation 1005 and operation 1007.

According to an embodiment, in operation 1011, the processor 120 may determine whether there is a parameter determined as hot data or cold data. When there is no parameter determined as hot data or cold data among a plurality of parameters in the file information analyzer 332, the processor 120 may configure the attribute of data selected to be updated as undefined data in operation 1015.

According to an embodiment, in operation 1013, there may be a parameter determined as hot data or cold data. In this case, the processor 120 may update the data attribute on the basis of a parameter having the highest (or a higher) priority among the parameters determined as hot data or cold data. For example, it may be assumed that the data attribute configured when the data is stored is hot data. At this time, the data may be selected as data to be updated and the data attribute may be determined as cold data on the basis of the time information parameter corresponding to the parameter having the highest (or a higher) priority. The processor 120 may calibrate the attribute of the data conventionally determined as hot data to cold data on the basis of the time information parameter.

The processor 120 according to an embodiment may update the attribute of the segment storing the data of which the attribute was updated in operation 1015. For example, like the example described through operation 1013, when the processor 120 updates the data attribute from hot data to cold data, the attribute of the segment storing the data of which the attribute was updated may also be updated from a hot segment to a cold segment.

In another embodiment, different pieces of data may be stored within one segment. Further, attributes of some of different pieces of data may be updated. In this case, cold data and hot data may be stored in one segment, and the processor 120 may configure the attribute of the segment as an undefined segment or a complex segment according to an embodiment.

In an embodiment, the processor 120 may determine whether the data attribute for the data to be updated is updated in operation 1019. When not all the data are updated, the processor 120 may repeatedly perform operation 1003 to operation 1017.

Figure 11:
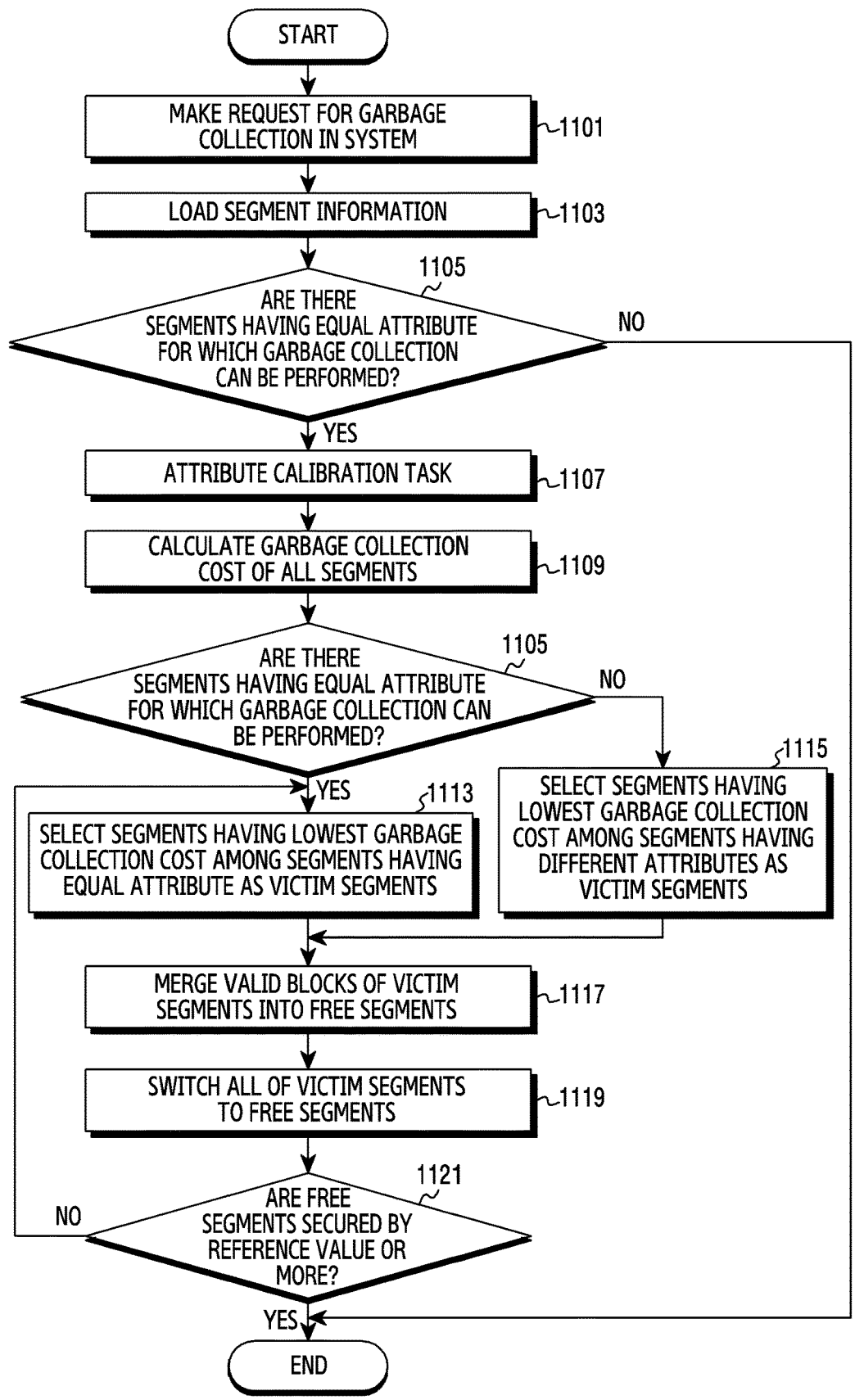
FIG. 11 illustrates the garbage collection operation of the electronic device according to an embodiment.

FIG. 11 is a flowchart illustrating the garbage collection operation of the electronic device according to an embodiment.

Referring to FIG. 11, in operation 1101, the processor 120 (for example, the processor 120 of FIG. 1) may receive a garbage collection request from the system. According to an embodiment, in operation 1103, the processor 120 may load segment information through the buffer memory 220 described with reference to FIG. 2. For example, the processor 120 may load capacity information of the segment and attribute information of the segment stored in the buffer memory 220. According to an embodiment, the garbage collector 320 may store the segment information stored in the buffer memory 220.

According to an embodiment, in operation 1105, the processor 120 may determine whether the garbage collection operation is needed. For example, when an available space of the storage device 210 (for example, the memory 130 of FIG. 1) is equal to or smaller than a predetermined reference or a predetermined time passes after the previous garbage collection, the processor 120 may determine that the garbage collection operation is needed.

According to an embodiment, the processor 120 may update attribute information of the data and segment before performing the garbage collection operation. In operation 1107, the processor 120 may perform the segment attribute calibration operation described with reference to FIG. 10 in order to update the attribute information of the data and segment. According to another embodiment, when it is not required to calibrate the attributes of the data and segment, the processor 120 may omit operation 1107.

The processor 120 according to an embodiment may calculate the garbage collection cost of all segments on the basis of updated segment information in operation 1109. In an embodiment, the garbage collection cost may be proportional to the capacity of valid data included in the segment.

According to an embodiment, the processor 120 may determine whether there are segments having the same attribute for which the garbage collection may be performed in operation 1111. For example, the processor may search for segments having the same attribute (for example, hot/cold) in a plurality of segments included in the storage device 210. The processor 120 may refer to segment information of the buffer memory 220 to perform operation 1111.

According to an embodiment, when there are segments having the same attribute, the processor 120 may select victim segments from among the segments having the same attribute in operation 1113. According to an embodiment, the processor 120 may select segments having the lowest (or a lower) garbage collection cost among the segments having the same attribute as victim segments.

According to an embodiment, when there are no two or more segments having the same attribute, the processor 120 may select segments having the lowest (or a lower) garbage collection cost among segments having different attributes as victim segments in operation 1115. For example, when the valid data capacity included in segments having the hot segment attribute and the cold segment attribute is low, the segments may be selected as victim segments.

The processor 120 according to an embodiment may merge valid data of the selected victim segments into free segments in operation 1117. For example, blocks storing the valid data included in the victim segments may be written in the free segments.

According to an embodiment, in operation 1119, the processor 120 may switch the selected victim segments to the free segments. For example, the processor 120 may generate free segments by performing an erase operation for the victim segments. The processor 120 may perform the garbage collection operation and determine whether the free segments are secured by a reference value or more in operation 1121. That is, it may be determined whether the available space of the storage device 210 is secured by the reference value or more. According to an embodiment, when the available space of the storage device 210 is smaller than the reference value, the processor 120 may repeatedly perform operation 1111 to operation 1119.

As described above, an electronic device (for example, the electronic device 101 of FIG. 1) according to an embodiment may include a storage device (for example, the storage device 210 of FIG. 2) including a plurality of segments configured to store data, a buffer memory (for example, the buffer memory 220 of FIG. 2) configured to store segment attributes corresponding to the plurality of segments, respectively, and at least one processor (for example, the processor 120 of FIG. 2) electrically connected to the storage device and the buffer memory, and the at least one processor may be configured to: determine, based on two or more parameters related to a data requested to be written, a data attribute, store the data requested to be written in a segment of the plurality of segments. The segment may correspond to the data attribute among the plurality of segments, store a segment attribute of the segment, the segment attribute being determined based on the data attribute in the buffer memory, update the data attribute, based on at least a data modification time of the data requested to be written, and update the segment attribute stored in the buffer memory, based on the updated data attribute.

According to an embodiment, the two or more parameters may include an extension name of the data requested to be written and a path name of the data requested to be written.

In an embodiment, the two or more parameters may have priorities corresponding to respective parameters, and the at least one processor may be configured to determine the data attribute, based on the priorities corresponding to the respective parameters.

The at least one processor according to an embodiment may be configured to predefine types of at least one data attribute and types of at least one segment attribute, and a type of the data attribute may be one of the types of the at least one data attribute.

In an embodiment, the types of the at least one data attribute may include hot data and cold data, and the at least one processor may be configured to store the segment attribute as a cold segment in the buffer memory in case that the data attribute is cold data and store the segment attribute as a hot segment in the buffer memory in case that the data attribute is hot data.

The at least one processor may be configured to update the updated segment attribute to one of types of at least one predefined segment attribute According to an embodiment, the at least one processor may be configured to determine segments having an equal attribute as targets subject to garbage collection, based on the segment attributes.

The at least one processor according to an embodiment may be configured to configure an update time of the buffer memory and update at least one segment attribute among the segment attributes stored in the buffer memory according to the configured time.

As described above, a method of operating an electronic device including a storage device (for example, the storage device 210 of FIG. 2) including a plurality of segments configured to store data requested to be written, a buffer memory (for example, the buffer memory 220 of FIG. 2), and at least one processor (for example, the processor 120) electrically connected to the storage device and the buffer memory may include an operation of determining, based on two or more parameters related to a data requested to be written, a data attribute, an operation of storing the data requested to be written in a segment of the plurality of segments. The segment may correspond to the data attribute, and an operation of storing a segment attribute of the segment, the segment attribute being determined based on the data attribute in the buffer memory.

In an embodiment, the method may further include an operation of updating the data attribute, based on the two or more parameters and at least one parameter related to the data attribute, different from the two or more parameters and an operation of updating the segment attribute, based on the updated data attribute.

The operation of determining the data attribute may include an operation of determining the data attribute, based on the two or more parameters including an extension name of the data requested to be written and a path name of the data requested to be written.

According to an embodiment, the operation of determining the data attribute may include an operation of determining the data attribute, based on a priority corresponding to each of the two or more parameters.

In an embodiment, the operation of updating the segment attribute may include an operation of updating the segment attribute, based on the at least one parameter related to the at least one parameter related to a data modification time of the data requested to be written.

According to an embodiment, the operation of updating the segment attribute may include an operation of updating at least one segment attribute among the segment attributes stored in the buffer memory to one of types of at least one segment attribute predefined by the at least one processor.

According to an embodiment, the method may further include an operation of determining segments having an equal attribute as target subject to garbage collection, based on a plurality of segment attributes stored in the buffer memory and performing the garbage collection operation.

As described above, an electronic device according to an embodiment may include a storage device (for example, the storage device 210 of FIG. 2) including a plurality of areas storing data, a buffer memory (for example, the buffer memory 220 of FIG. 2), and at least one processor (for example, the processor 120 of FIG. 2) functionally connected to the storage device and the buffer memory and configured to receive a data write request, and the at least one processor may be configured to determine, based on two or more parameters related to a data requested to be written, a data attribute, control the storage device to store the data requested to be written in a first area corresponding to the data attribute among the plurality of areas, and store an attribute of the first area determined based on the data attribute in the buffer memory.

According to an embodiment, the at least one processor may update the data attribute, based on at least a data modification time of the data requested to be written and update an attribute of a first area, based on the updated data attribute.

In an embodiment, the at least one processor may include a data storage module configured to determine the data attribute as one of types of at least one predefined data attribute, based on a priority corresponding to each of the two or more parameters and store the data requested to be written in an area corresponding to the determined data attribute and a garbage collector configured to determine data attributes of data stored in the plurality of areas, based on at least the data modification time, update at least one area attribute among a plurality of area attributes stored in the buffer memory, based on determination information of an attribute calibration module configured to generate the determination information of the determination, and perform a garbage collection operation, based on the plurality of area attributes.

According to an embodiment, the garbage collector may determine areas having the same attribute among the plurality of areas as targets subject to garbage collection and perform the garbage collection operation.

The garbage collector according to an embodiment may update the at least one area attribute to one of types of at least one predefined area attributes, based on determination result information.

What is claimed is:

1. An electronic device comprising:
    a storage device comprising a plurality of segments configured to store data;
    a buffer memory configured to store segment attributes corresponding to the plurality of segments, respectively; and
    at least one processor electrically connected to the storage device and the buffer memory,
    wherein the at least one processor is configured to:
        determine, based on two or more parameters related to a data requested to be written, a data attribute;
        store the data requested to be written in a segment of the plurality of segments, the segment of the plurality of segments being corresponding to the data attribute among the plurality of segments;
        store, in the buffer memory, a segment attribute of the segment, the segment attribute in the buffer memory being determined based on the data attribute in the buffer memory;
        update the data attribute, based on at least a data modification time of the data requested to be written; and
        update the segment attribute, based on the updated data attribute, and
    wherein the two or more parameters comprise an extension name of the data requested to be written and a path name of the data requested to be written.

2. The electronic device of claim 1, wherein at least one of the two or more parameters has a priority corresponding to a respective parameter, and
    the at least one processor is further configured to determine the data attribute based on the priority corresponding to the respective parameter.

3. The electronic device of claim 1, wherein the at least one processor is further configured to predefine a type of the data attribute and a type of the segment attribute.

4. The electronic device of claim 3, wherein the type of the data attribute comprises hot data and cold data, and
    wherein the at least one processor is further configured to:
        store the segment attribute as a cold segment in the buffer memory based on the type of the data attribute, which is cold data; and
        store the segment attribute as a hot segment in the buffer memory based on the type of the data attribute, which is hot data.

5. The electronic device of claim 1, wherein the at least one processor is further configured to update the segment attribute to one type of predefined segment attributes.

6. The electronic device of claim 5, wherein the at least one processor is further configured to determine, based on the segment attribute, segments comprising an equal attribute as targets of garbage collection.

7. The electronic device of claim 1, wherein the at least one processor is further configured to:
    configure an update time of the buffer memory; and
    update at least one segment attribute among multiple segment attributes stored in the buffer memory based on the configured update time.

8. A method performed by an electronic device, the method comprising:
    determining, based on two or more parameters related to a data requested to be written, a data attribute;
    storing the data requested to be written in a segment of a plurality of segments, the segment being corresponding to the data attribute; and
    storing a segment attribute of the segment, the segment attribute being determined based on the data attribute,
    wherein the two or more parameters comprise an extension name of the data requested to be written and a path name of the data requested to be written.

9. The method of claim 8, further comprising:
    updating the data attribute, based the two or more parameters and at least one parameter related to the data attribute, the at least one parameter being different from the two or more parameters; and
    updating the segment attribute based on the updated data attribute.

10. The method of claim 8, wherein the determining of the data attribute comprises determining the data attribute based on a priority corresponding to at least one of the two or more parameters.

11. The method of claim 9, wherein the updating of the segment attribute comprises updating the segment attribute based on the at least one parameter related to a data modification time of the data requested to be written.

12. The method of claim 11, wherein the updating of the segment attribute comprises updating at least one segment attribute among multiple segment attributes to one type of predefined segment attributes.

13. The method of claim 8, further comprising:
   determining segments comprising an equal attribute as targets of garbage collection based on a plurality of segment attributes; and
   performing the garbage collection operation.

* * * * *